June 27, 1933.  E. F. BRAASCH  1,915,401
HARVESTER
Filed Aug. 8, 1932   5 Sheets-Sheet 2

Inventor
E. F. Braasch
By Clarence A. O'Brien
Attorney

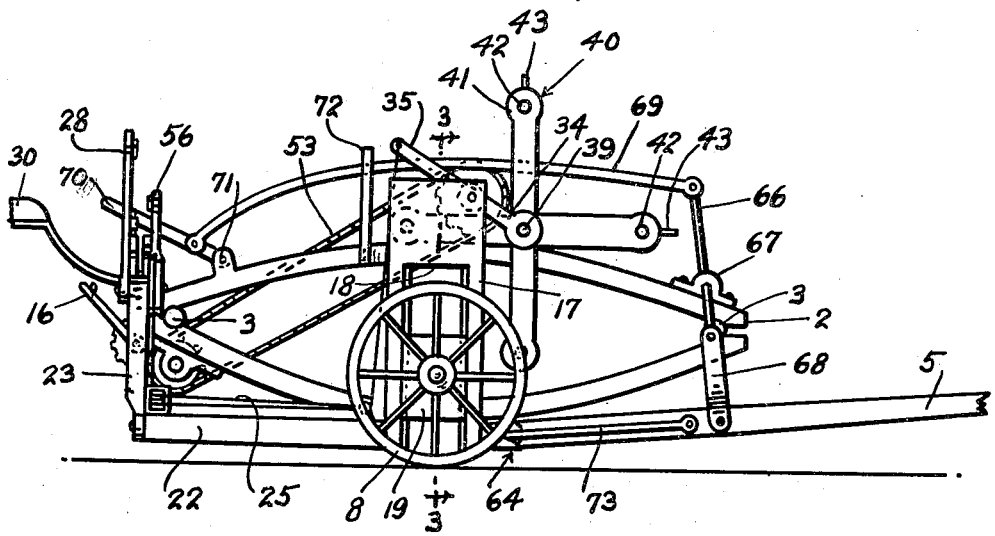
Fig. 4.
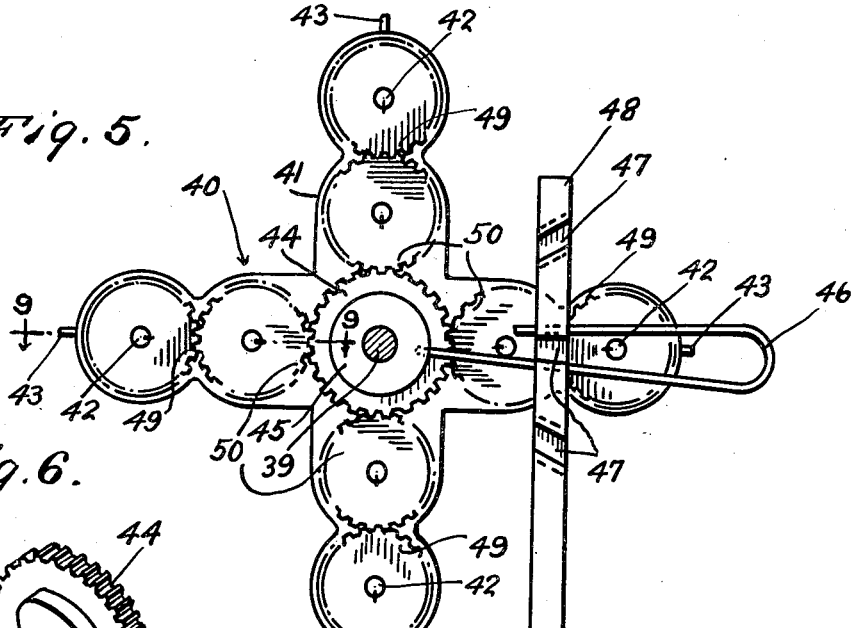
Fig. 5.
Fig. 6.
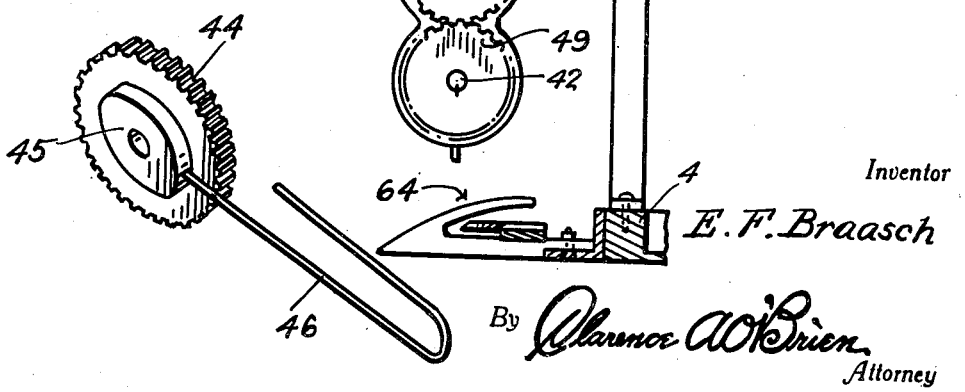
Inventor
E. F. Braasch
By Clarence A. O'Brien
Attorney June 27, 1933.   E. F. BRAASCH   1,915,401
HARVESTER
Filed Aug. 8, 1932   5 Sheets-Sheet 4
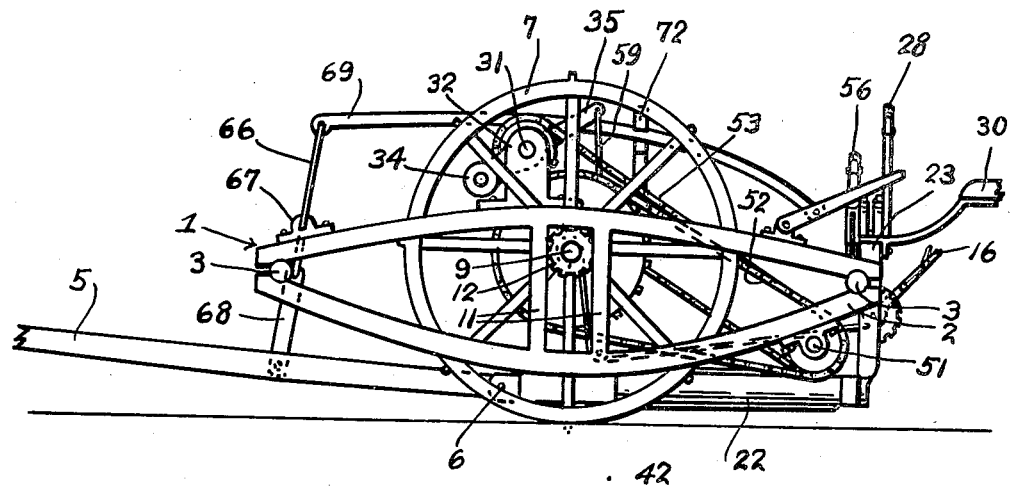
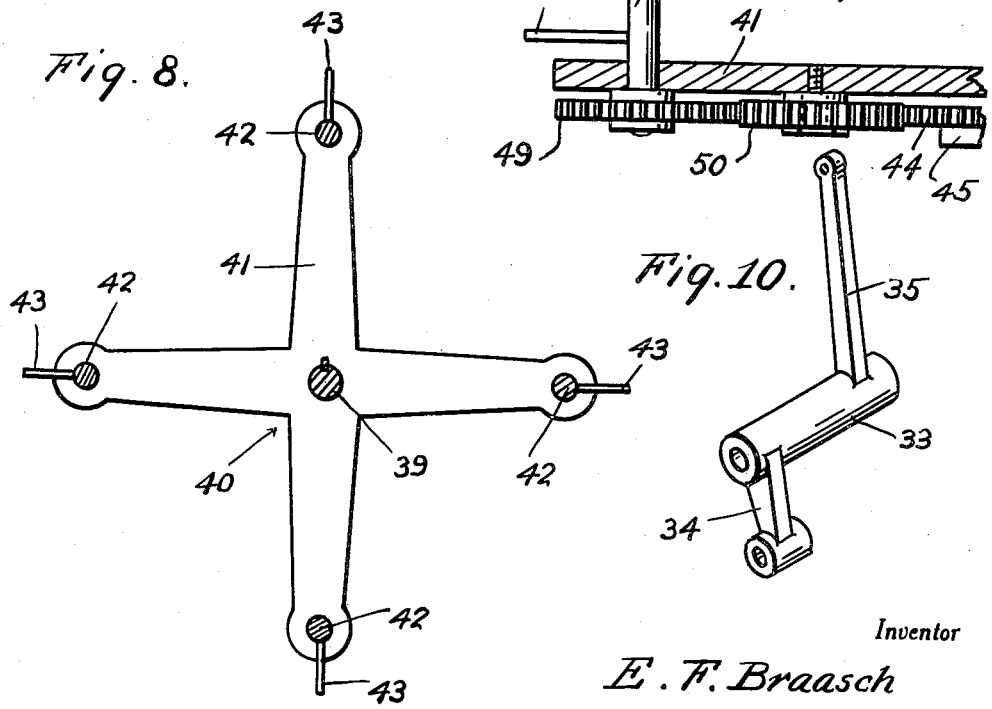
Inventor
E. F. Braasch
By Clarence A. O'Brien
Attorney

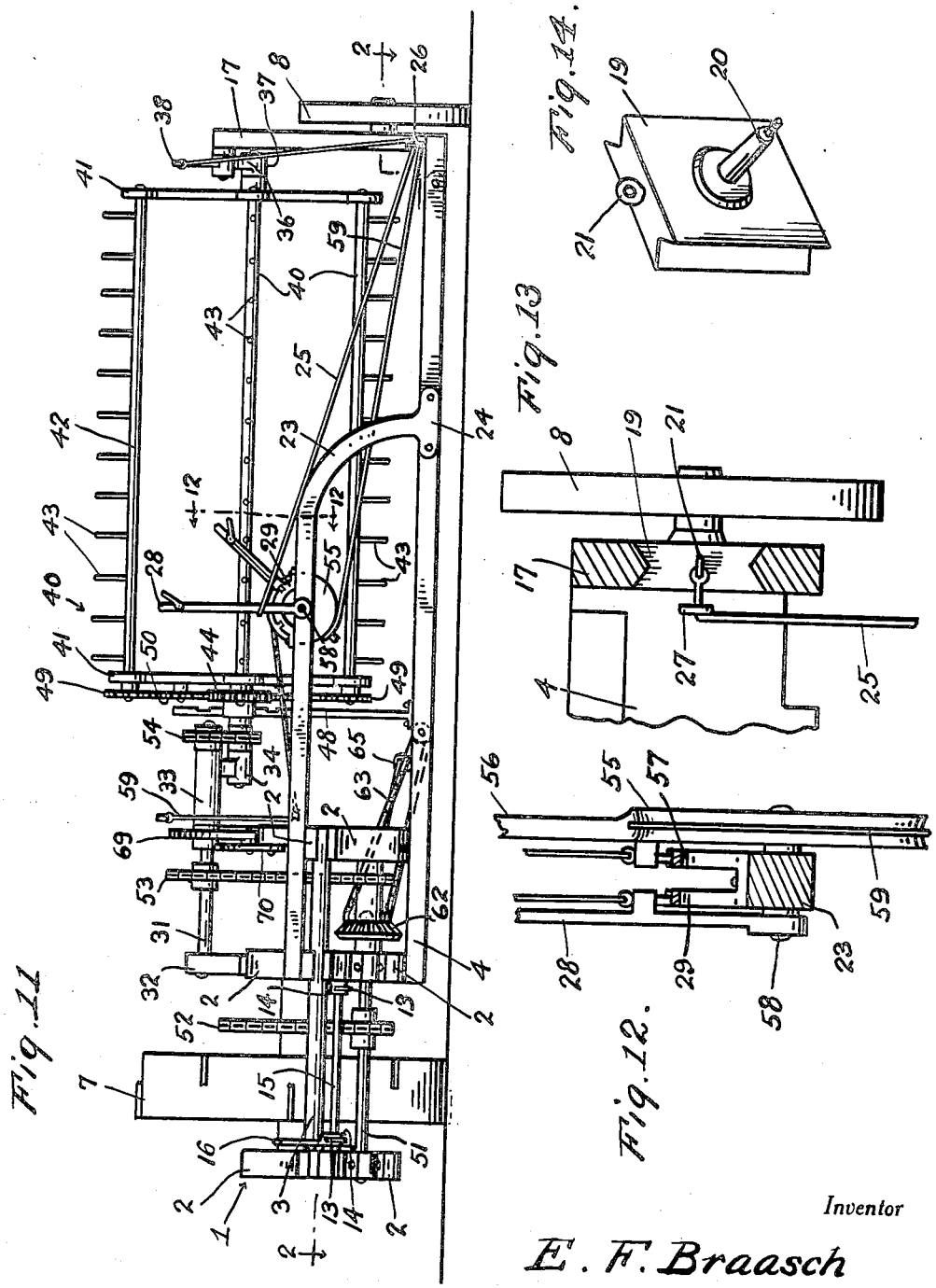

Patented June 27, 1933

1,915,401

UNITED STATES PATENT OFFICE

EDDIE F. BRAASCH, OF VAN DYNE, WISCONSIN

HARVESTER

Application filed August 8, 1932. Serial No. 627,975.

The present invention relates to a harvester which is particularly intended and designed for harvesting various kinds of peas and has for some of its objects to provide, in a manner as hereinafter set forth, a machine of this character which will be simple in construction, strong, durable, highly efficient and reliable in use, light in weight, compact, adjustable and which may be manufactured and operated at low cost.

All of the foregoing and still further objects and advantages of the invention will become apparent from a study of the following specification, taken in connection with the accompanying drawings wherein like characters of reference designate corresponding parts throughout the several views, and wherein:—

Figure 4 is a view in side elevation of the harvester.

Figure 5 is a view in vertical longitudinal section through the machine, showing one end of the reel and the gears thereon.

Figure 6 is a detail view in perspective showing the central adjustable reel gear.

Figure 7 is an elevational view, looking at the other side of the machine.

Figure 8 is a detail view in vertical section through the reel.

Figure 9 is a detail view in section, taken substantially on the line 9—9 of Figure 5.

Figure 10 is a detail view in perspective of one of the swinging reel supporting members.

Figure 11 is a view in rear elevation of the harvester.

Figure 12 is a detail view in vertical section, taken substantially on the line line 12—12 of Figure 11.

Figure 13 is a detail view in horizontal section, taken substantially on the line 13—13 of Figure 3.

Figure 14 is a detail view in perspective of the vertically adjustable wheel block.

Figure 1:
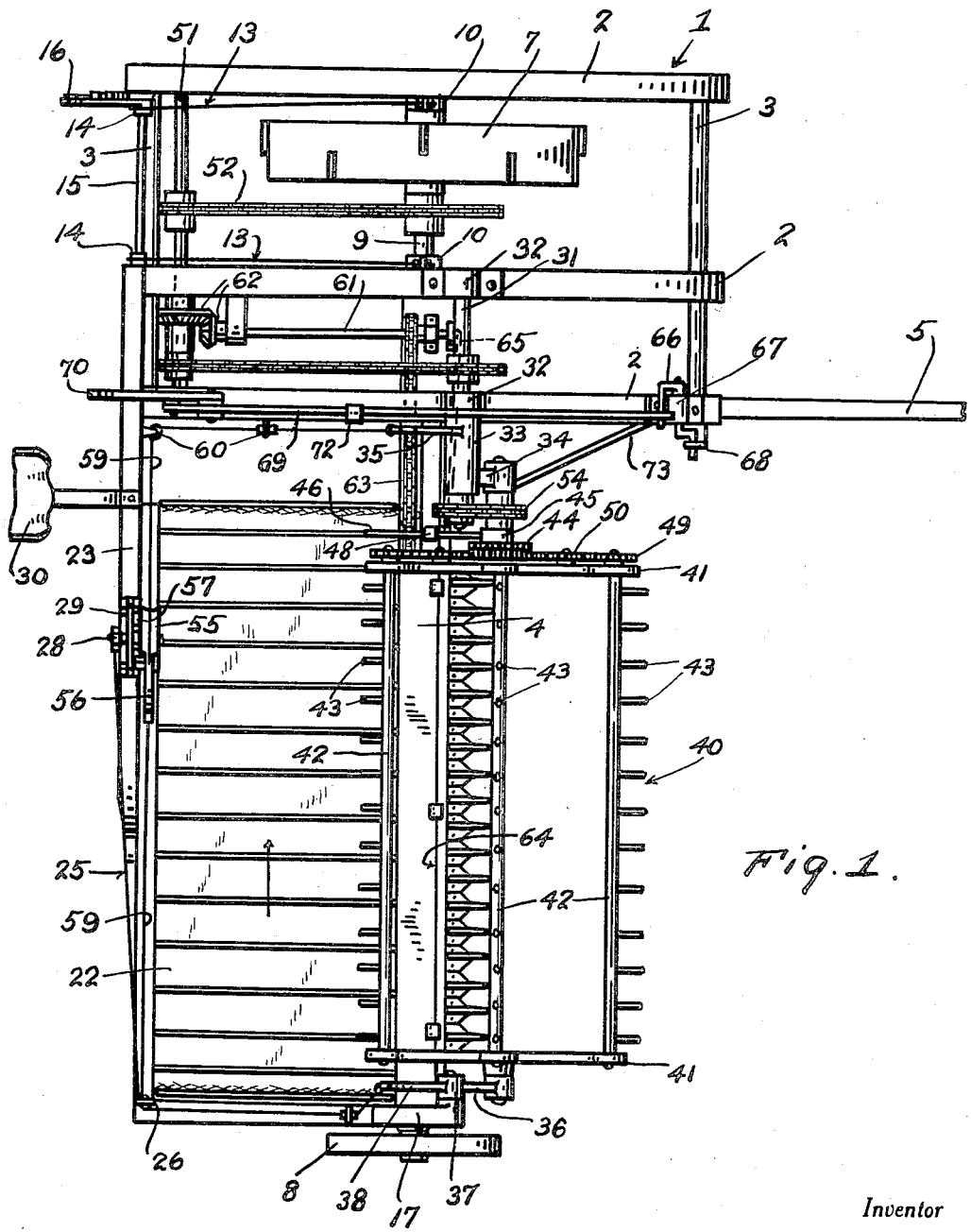
Figure 1 is a view in top plan, showing a harvester constructed in accordance with the present invention.
Figure 2:
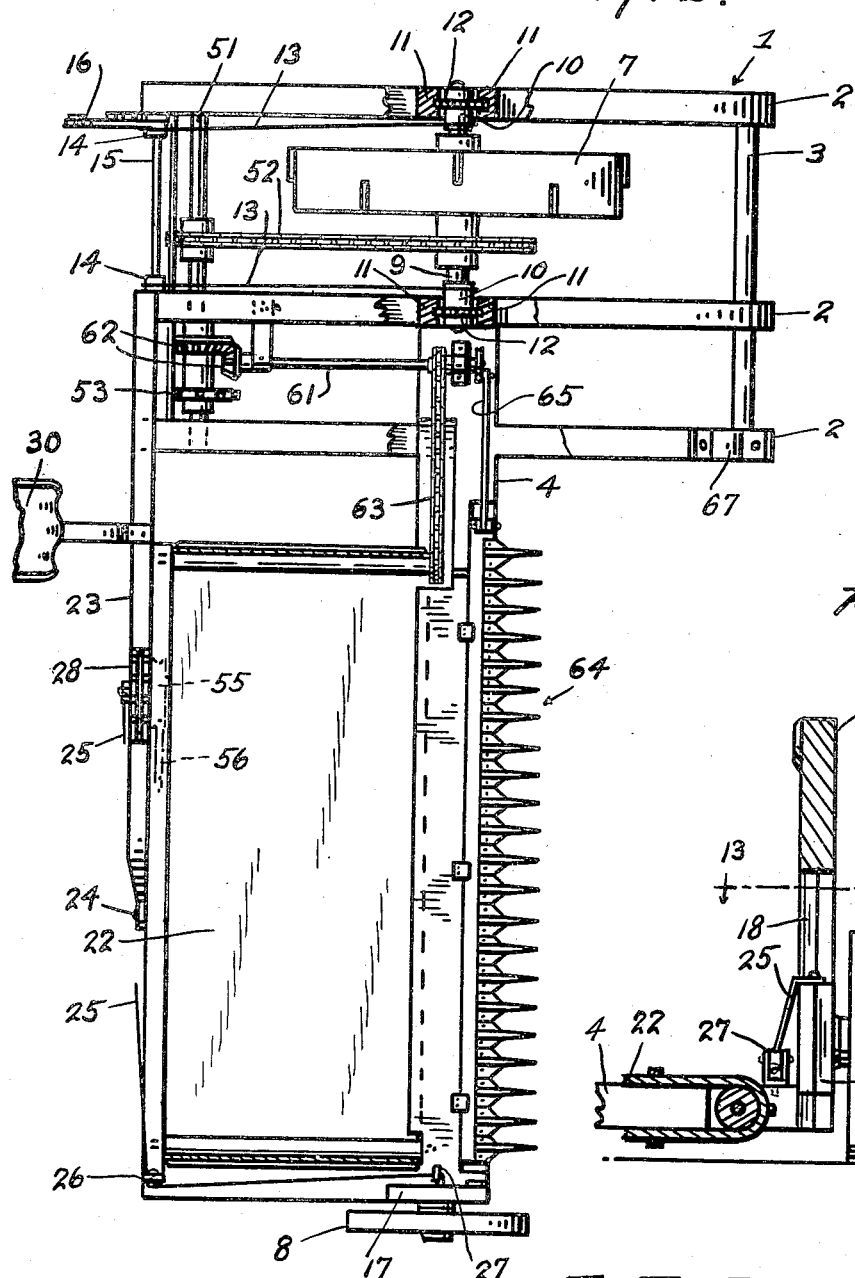
Figure 2 is a view in horizontal section, taken substantially on the line 2—2 of Figure 11.

Referring now to the drawings in detail, it will be seen that the embodiment of the present invention which has been illustrated comprises a frame which is designated generally by the reference numeral 1, said frame including longitudinally extending, oppositely bowed pairs of bars 2 between the end portions of which extend transverse bars 3. The frame 1 further includes a transverse bar 4 which projects laterally from the lowermost of the inner pairs of bars 2. A tongue 5 is pivotally connected, as at 6, to the frame 1 for swinging movement in a vertical plane.

The frame 1 is mounted for vertical adjustment on a main wheel 7 and a comparatively small wheel 8. The wheels 7 and 8 are adjustable independently of each other. The main wheel 7 is journaled on an axle 9 having its ends journaled in drums 10 which are operable vertically between pairs of spaced, parallel bars 11 which extend between the outer pairs of bars 2 of the frame 1. Thus, the main wheel 7 is mounted in the frame 1. Gears 12 are provided on the drums 10 and are operatively engaged with racks which are provided therefor in channels in one of the bars 11 of each pair of said bars 11. The other bar 11 of each pair is provided with a guide channel for accommodating the gears 12. Cables 13 are trained over suitable pulleys on the lower portion of the frame 1 and have one end connected to the drums 10 for winding on said drums. The other ends of the cables 13 are connected to drums 14 for winding thereon, said drums 14 being fixed on a transverse shaft 15 which is journaled on a rear portion of the frame 1. A hand lever 16 is provided for actuating the shaft 15 for rotating the drums 10 through the medium of the cables 13 for raising or lowering the frame 1 relative to the main wheel 7.

Figure 3:
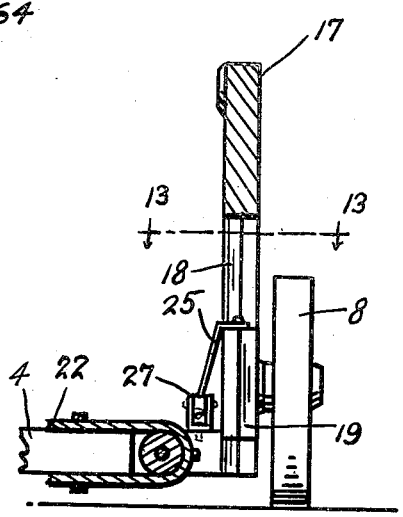
Figure 3 is a detail view in vertical transverse section, taken substantially on the line 3—3 of Figure 2.

Rising from the free end portion of the transverse bar 4 of the frame 1 is a standard 17 having an opening 18 extending vertically therein from its lower end in which a block 19 is mounted for vertical adjustment. The vertical side edges of the block 19 are grooved to receive tongues constituting the vertical walls of the recess 18. This is illustrated to advantage in Figures 3, 13 and 14 of the drawings. Projecting laterally from the block 19 is a spindle 20 upon which the wheel 8 is journaled. An eye 21 is anchored on the block 19.

Mounted on the bar 4 of the frame 1 and extending rearwardly therefrom is a horizontal, endless apron 22. The apron 22 is mounted transversely on the machine and is supported at its rear by an arm 23 having one end portion fixed on the rear end portions of the inner pairs of bars 2 of the frame 1, said arm 23 having a down-turned end portion secured to the frame of the apron 22, as at 24. A cable 25 is trained over suitably arranged guides, as at 26 and 27 (see Figures 3 and 11) and has one end secured to the eye 21 on the block 19. The other end of the cable 25 is secured to a hand lever 28 which is mounted for swinging movement on an intermediate portion of the arm 23. As will be apparent, the cable 25 and lever 28 constitute means for adjusting the block 19 vertically in the opening 18 of the standard 17 for raising and lowering the machine on the wheel 8. The lever 28, of course, is provided with suitable means, as at 29, for securing said lever in adjusted position. An operator's seat 30 is also mounted on the arm 23.

The reference numeral 31 designates a shaft which is mounted transversely in bearings provided therefor on the inner pairs of bars 2 of the frame 1. These bearings are indicated at 32. The shaft 31 is provided with a free portion upon which is journaled a sleeve 33 (see Figures 1 and 10) from one end of which an arm 34 projects. A comparatively long arm 35 projects from the other end portion of the sleeve 33. The reference numeral 36 designates an arm which is similar to the arm 34 and which is pivotally mounted, as at 37, on the upper portion of the standard 17. An arm 38, similar to the arm 35, projects from the hub or sleeve 37 of the arm 36. The free end portions of the arms 34 and 36 are provided with transversely aligned bearings in which the shaft 39 of a reel which is designated generally by the reference numeral 40 is journaled.

The reel 40 comprises spiders 41 which are fixed on the end portions of the shaft 39. Shafts 42 are journaled in the free end portions of the arms of the spiders 41 and have projecting therefrom series of fingers 43. Loosely mounted on the shaft 39 adjacent the innermost spider 41 of the reel 40 is a gear 44 having a laterally projecting hub portion 45 in which the free end of the comparatively long arm of a substantially U-shaped, resilient lever 46 is anchored. The lever 46 is engageable selectively in vertically spaced notches 47 which are provided therefor in a vertical bar 48 which rises from the bar 4 of the frame 1. The notches 47 are shaped to receive and retain the resilient lever 46, as illustrated to advantage in Figure 5 of the drawings. As will be apparent, the lever 46 provides means for rotatably adjusting the gear 44 and for retaining said gear in adjusted position. Gears are fixed on the inner ends of the shafts 42 of the reel 40 and are operatively connected to the gear 44 by intermediate gears 50 which are rotatably mounted on the innermost spider 41. It will thus be seen that when the reel 40 is rotated, the shafts 42 of said reel will be caused to rotate in the spiders 41 through the medium of the gears 49 and 50 which travel around the stationary gear 44. By rotatably adjusting the stationary gear 44, the pitch or angle of the fingers 43 when they engage the material may be controlled or adjusted.

A main shaft 51 is journaled transversely on a rear portion of the frame 1 and is operatively connected by a chain and sprocket connection 52 to the main wheel 7 for actuation thereby. A chain and sprocket connection 53 operatively connects the shaft 31 to the main shaft 51. Then, a chain and sprocket connection 54 operatively connects the reel shaft 39 to the shaft 31 for actuation thereby. It will thus be seen that the reel 40 is driven by the main wheel 7. If desired, a suitable clutch may be interposed at any desired point in the reel driving mechanism for disconnecting the reel from the wheel 7.

The reference numeral 55 designates a grooved pulley which is rotatably mounted on the arm 23 adjacent the hand lever 28. A hand lever 56 is fixed on the pulley 55 for manually rocking said pulley and, as best seen in Figure 12, said hand lever is provided with suitable means, as at 57, for releasably securing the hand lever in adjusted position. It will be noted that the pulley 55 and the hand lever 28 are journaled on a common pivot pin 58 which passes through the arm 23. Further, the latching means 29 and 57 for the levers 28 and 56 are identical. Cables 59 have one end secured to opposite sides of the periphery of the pulley 55 for winding on said pulley. The cables 59 extend in opposite directions from the pulley 55 over suitably arranged guides and pulleys 60 and have their other ends connected to the arms 35 and 38. It will thus be seen that when the lever 56 is actuated to rock the pulley 55, the arms 34 and 36 will be swung to raise or lower the reel 40.

The reference numeral 61 designates a shaft which is journaled longitudinally on the frame 1, said shaft being connected to the main shaft 51 for actuation thereby through the medium of beveled gears 62. A chain and sprocket connection 63 operatively couples the shaft 61 to the apron 22. The reference numeral 64 designates a cutter bar which is mounted on the forward side of the bar 4 of the frame 1. A pitman 65 operatively connects the cutter bar 64 to the shaft 61 for actuation by said shaft 61.

The reference numeral 66 designates an angular lever having an intermediate portion journaled in a bearing 67 which is provided therefor on a forward portion of the frame 1. One end of the lever 66 is operatively connected to the tongue 5 through the medium of a link 68. A comparatively long bowed link 69 operatively connects the other end of the angular lever 66 to an intermediate portion of a hand lever 70 which is pivotally mounted, as at 71, on a rear portion of the frame 1. A rack bar 72 rises from the frame 1 for engagement with the link 79 for releasably securing said link in adjusted position, thus retaining the tongue 5 in adjusted position. The reference numeral 73 designates a brace for the tongue 5.

Briefly, the operation of the machine is as follows:—

As the harvester moves over the ground, the cutter bar 64 and the reel 40 are driven by the main wheel 7 in the manner previously explained. The rotating wheel 40 sweeps the pea vines over the cutter bar 64 which, of course, severs said vines which are then deposited on the apron 22 which travels in the direction indicated by the arrow in Figure 1 of the drawings. As previously set forth, the position or angle of the fingers or teeth 43 of the reel 40 at the time they engage the vines may be regulated as desired by adjusting the gear 44. The machine may be adjusted vertically on its supporting wheels 7 and 8 through the medium of the hand levers 16 and 28, respectively. As also previously explained, the reel 40 may be swung in a vertical plane for adjustment relative to the cutter bar 64 through the medium of the hand lever 56 which is fixed on the periphery of the pulley 55.

It is believed that the many advantages of a harvester constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A harvester comprising a wheeled frame, a reel rotatably mounted on the frame, said reel including a rotary shaft, spiders fixed on the shaft, rotary shafts journaled in the spiders, teeth projecting from the second named shafts, gears fixed on the second named shafts, a gear mounted for rotary adjustment on the first named shaft, gears operatively connecting the first named gears to the second named gear for actuation thereby, means for rotatably adjusting said second named gear and for securing the same in adjusted position, and means for actuating the reel.

2. A harvester comprising a wheeled frame, a cutter bar mounted on the frame, means for actuating the cutter bar, an endless apron mounted on the frame rearwardly of the cutter bar, means for actuating the apron, a pair of arms pivotally mounted for swinging movement in a vertical plane on the frame, a reel rotatably mounted on the arms, means for actuating the reel, a pulley rotatably mounted on the frame, a hand lever for actuating the pulley, and cables operatively connecting the arms to the pulley for actuation thereby for adjusting the reel relative to the cutter bar.

3. A harvester comprising a wheeled frame, a cutter bar mounted on the frame, means for actuating the cutter bar, an apron mounted on the frame, means for actuating the apron, a reel rotatably mounted on the frame, means for actuating the reel, a tongue pivotally mounted on the frame, and means for adjusting the tongue, the last named means including an angular lever pivotally mounted, at an intermediate point, on the frame, a link operatively connecting the lever to the tongue, a hand lever pivotally mounted on the frame, a link operatively connecting the first named lever to the hand lever for actuation thereby, and a rack bar mounted on the frame and operatively engageable with the second named link for securing the tongue in adjusted position.

4. A harvester comprising a wheeled frame, a reel rotatably mounted on the frame, means for actuating the reel, said reel including rotary shafts, a rotatably adjustable actuating gear operatively connected to the shafts, and means for securing the gear in adjusted position, the last-named means comprising a member mounted on the frame and having spaced notches therein, and a substantially U-shaped, resilient lever mounted on the gear and engageable selectively in the notches.

In testimony whereof I affix my signature.

EDDIE F. BRAASCH.